Aug. 16, 1949. H. G. VESTERDAL 2,479,435
PROCESS OF REDUCING IRON GROUP METAL OXIDES
Filed May 14, 1946
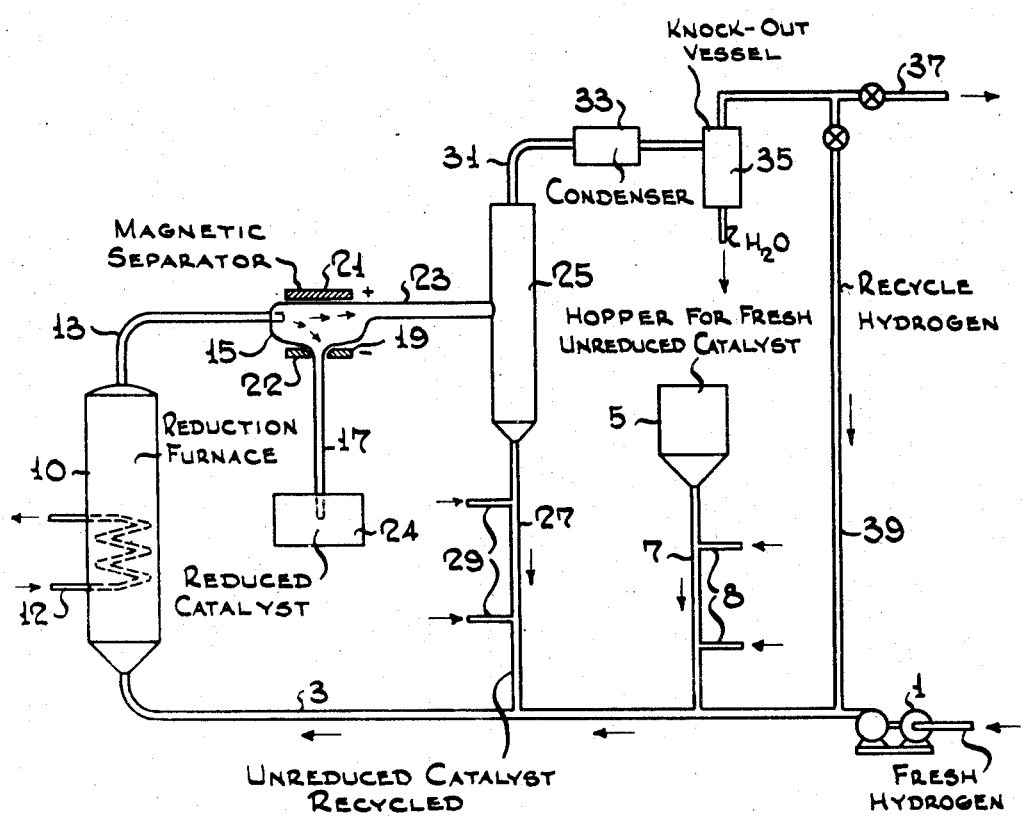
Hans G. Vesterdal Inventor
By P. J. Whelan Attorney Patented Aug. 16, 1949

2,479,435

UNITED STATES PATENT OFFICE 2,479,435

PROCESS OF REDUCING IRON GROUP METAL OXIDES

Hans G. Vesterdal, Elizabeth, N. J., assignor to Standard Oil Development Company, a corporation of Delaware Application May 14, 1946, Serial No. 669,530

6 Claims. (Cl. 252—472)

1

The present invention relates to the reduction of oxygen compounds of metals. More particularly the invention is concerned with the reduction of oxygen compounds of iron group metals such as the oxides and carbonates of iron, nickel, and cobalt to obtain reduction products useful as catalysts for the synthesis of hydrocarbons from carbon monoxide and hydrogen, the hydrogenation of hydrocarbon oils, or the like catalytic processes.

The synthesis of hydrocarbons from carbon monoxide and hydrogen in the presence of iron group metals, particularly metallic iron and cobalt is well known in the art. Active synthesis catalysts are usually prepared by passing a stream of a reducing gas such as hydrogen or mixtures of hydrogen and carbon monoxide through a fixed bed of a synthetic or natural metal oxide at reduction temperatures of about 500–1200° F., depending on the character of the metal oxide involved. In order to avoid an excessive pressure drop across the bed of metal oxide the latter has been used in particles of relatively large size. As a result several hours are usually required to accomplish reduction to the desired degree. Aside from the loss of time incurred this procedure has other distinct disadvantages. The distribution of heat and gaseous reactants in a fixed bed of coarse metal oxide particles is rather poor, which interferes greatly with the control of the reduction process and the formation of a uniform reduction product. Moreover, the catalytic activity of the reduced metal is detrimentally affected when the latter is exposed to the high temperatures of the reduction process, mainly due to the sintering phenomena. It is, therefore, desirable to carry out the reduction of the metal oxide in such a manner that the desired degree of reduction will be reached within the shortest possible time and the reduced product is removed, immediately upon its formation, from the reduction zone.

This may be accomplished to a certain degree by suspending finely divided metal oxides of a sufficiently small particle size in the reducing gas and passing this solids-in-gas suspension through a reduction zone at such a velocity as will allow for the desired reduction and prevent any damaging exposure of the reduced product to the temperatures of the reduction zone. It has been observed, however, that at the extremely high space velocities required for this purpose the reduction product contains a substantial proportion of unreduced or insufficiently reduced metal oxide

2 particles which depress the average catalytic activity of the reduction product.

My invention overcomes the aforementioned difficulties and affords various additional advantages. These advantages, the nature of the invention and the manner in which it is performed will be fully understood from the following description thereof read with reference to the drawing which shows a semi-diagrammatic view of an apparatus particularly adapted to carry out the invention.

It is the principal object of my invention to provide an improved process of reducing oxygen compounds of metals.

Another object of my invention is to provide a process of reducing oxygen compounds, particularly oxides, of iron group metals to obtain reduced products of highest catalytic activity for the synthesis of hydrocarbons from carbon monoxide and hydrogen.

A further object of my invention is to prepare iron group metal catalysts of highest activity in the hydrocarbon synthesis.

Further objects and advantages will appear from the following more detailed description and claims.

I have found that these objects and advantages may be accomplished by subjecting finely divided oxygen compounds of ferro-magnetic metals, particularly iron group metal oxides and carbonates in the form of a suspension in a reducing gas to reducing tempertures in a reduction zone for a time sufficient to cause partial reduction of the suspended particles but insufficient to decrease the activity of reduced particles, separating and recovering from the resulting suspension the particles of the desired degree of reduction by means of a magnetic field and recycling particles of a lesser degree of reduction to the reduction zone. In this manner, the reduced metal product may be removed from the reduction zone as soon as it is formed and the metal oxide charged may be completely converted into a catalyst of the highest synthesizing activity at a minimum expense of heat, reducing gas and reactor space.

Catalyst reduced in accordance with my invention may be prepared from powdered oxides and carbonates, or mixtures thereof with metals, for example, oxidic metal ores, such as magnetite, hematites, limonite, franklinite, etc., as well as burnt pyrites and iron oxide pigments, or the active ingredients may be precipitated on supports such as cellite, clay, bentonite, silica gel, etc. together with various promoters.

Temperature, pressure and contact time in the reduction zone may be varied within wide limits depending on the type of catalyst produced. In general, good results are obtained at reduction temperatures of about 400–800° F. for the oxides or carbonates of cobalt and nickel, and of about 600°–1600° F. for precipitated iron oxides and iron ores. Contact times of about 0.5–10 minutes depending on the reduction temperature and particle size of the oxide have been found to be operative to establish the desirable rate of reduction of approximately 50–75% per pass. The metal oxides and the like to be reduced may be suspended in the reducing gas such as hydrogen, synthesis feed gas or the like, either to form a true solids-in-gas suspension in which gas and solids move at about the same speed in upward flow, or to form a so-called "fluidized" mass in which the solids move at substantially lower speed than the gas, exhibiting the phenomenon of hindered settling. In the latter case the solids may even form a dense turbulent mass resembling a boiling liquid fluidized by the reducing gas and forming a well defined upper level, from which the solids may be withdrawn in a downward stream independent of the stream of spent reducing gas. Suitable particle sizes of the metal oxide may be selected from the wide range of about 400 mesh to ½ in. diameter in combination with superficial gas velocities falling within the approximate limits of 0.3–30 ft. per second depending on the desired density of the suspension.

Solid reduction product suspended in gas is passed from the reduction zone through a magnetic separation zone in which the flow speed of the suspension and the strength and location of the magnetic field are preferably so correlated that solids of a higher degree of reduction are more strongly deflected from the path of the carrier gas than solids of a lower degree of reduction, due to the pronounced differences in magnetic properties caused by changes in the oxygen content of the iron group metals at otherwise equal conditions. In this manner it is possible to accomplish a relatively fine fractionation of the solid reduction product by the degree of reduction and I may recover from the magnetic separation zone a solids fraction of highest catalytic activity and one or more fractions of lower catalytic activity and higher oxygen content. The former may be stored or directly passed to the synthesis reactor while the latter are either recycled to the reduction zone from which they are derived or passed to another reduction zone which may be operated at conditions more favorable to the further reduction of this material.

The conditions of flow speed, temperature and strength of magnetic field most suitable for the separation zone vary widely depending on the character of the metal oxide used, the desired degree of reduction of the refined product and the size and shape of the separation zone. Proper conditions may be readily determined by those skilled in the art in each individual case with the aid of routine calculations and experiments.

For example, when applied to the reduction of magnetite ore the following conditions have been found satisfactory. The particle size of the ore may vary from about 80 to 325 mesh. The linear velocity of the hydrogen in the reduction zone should be maintained between about 0.5 and 3.0 ft. per second, preferably at about 2 ft. per second and the linear gas velocity in the magnetic separator between about 0.1 and 1.0 ft. per second, preferably at about 0.5 ft. per second. The temperature in the reduction zone may range from about 500° to about 1600° F., a temperature of about 900° F. being preferred, while the temperature in the magnetic separator should be kept between about 400° and 1200° F., preferably at about 600° F. Atmospheric pressure is preferred, though pressures as high as about 50 atm. gauge may be applied. The magnetic field intensity may fall within the approximate limits of about 500 to 10,000 gauss, about 2,000 gauss being preferred. At these conditions and at an average retention time of solids in the reduction zone of about 2–5 minutes, preferably about 3 minutes, the degree of reduction may be so adjusted that, per pass, about 50–75%, preferably about 60% of the ore is reduced to an oxygen content of less than 2%.

Having set forth the general nature and objects, my invention will be best understood from the more detailed description hereinafter in which reference will be made to the drawing which illustrates a preferred embodiment of my invention.

Referring now in detail to the drawing, the system shown essentially comprises a vertical reduction chamber 10, a magnetic separator 15 and a conventional gas-solids separation zone 25 which cooperate as will be forthwith explained, using the reduction of magnetite to produce an iron catalyst of highest synthesizing activity as an example. It should be understood, however, that other iron oxides may be used and other iron group synthesis catalysts such as cobalt or nickel catalysts may be produced in a substantially analogous manner from the oxides and carbonates of these metals.

A reducing gas such as hydrogen which may be preheated to a temperature of about 800°–1200° F. is supplied to blower 1 to line 3. Finely divided magnetite approximating the composition $Fe_3O_4$ and having a particle size of preferably 100–200 mesh is fed from hopper 5 to line 3 through a standpipe 7 aerated through lines 8 by small amounts of an aerating gas, such as a reducing or inert gas. The magnetite powder is suspended in the hydrogen flowing through line 3 and the suspension is passed to the bottom portion of reduction chamber 10. About 2 to 5 pounds of magnetite is passed per cu. ft. of hydrogen through line 3. The superficial velocity of the gas in reduction chamber 10 is preferably so controlled that a slight slippage of the magnetite particles takes place to establish the phenomenon of hindered settling. Superficial gas velocities of about 1 to 10 ft. per second have been found to be adequate for this purpose at the magnetite particle size indicated. Reduction zone 10 is so dimensioned as to allow for a residence time of the magnetite particles of about 2–5 minues. A heat transfer coil 12 of conventional design may be used to supply or withdraw heat in order to maintain the temperature within chamber 10 at a desired level falling between about 900 and 1200° F. Pressures ranging from subatmospheric up to about 50 atmospheres or higher may be employed.

A suspension of finely divided metallic iron, unchanged magnetite and intermediate iron oxides in a gas mixture comprising unreacted hydrogen and water vapor is withdrawn overhead from chamber 10 through line 13. At the conditions indicated, the solids will comprise about 50% to 75% of metallic iron plus iron containing less than about 10% of oxygen, the remainder being higher oxides such as magnetite and intermediate oxides. This suspension is passed in preferably horizontal flow, at an average solids velocity of about 0.1 to 1.0 ft. per second through the magnetite separation zone 15 which is preferably so designed that iron particles containing up to about 5% oxygen are sufficiently deflected from their horizontal path to drop into line 17 or to hit and slide down the substantially vertical wall 19 of separator 15 to enter line 17 by gravity, while oxides of higher oxygen content remain suspended in the gas and leave separator 15 through line 23. The magnet which is schematically indicated at 21 and 22 may be of the permanent or electro-magnetic type. The strength of the magnetic field across separator 15 depends on the velocity of the solid particles and the size and space of separator 15 and may be readily adjusted to accomplish the desired separation.

Reduced iron catalyst of the desired highest activity amounting to about 50% to 75% of the solids in separator 15 passes through line 17 to a receiving vessel 24 to be subsequently used in the hydrocarbon synthesis. A suspension of iron oxide in hydrogen and water vapor flows through line 23 into gas solids separator 25 which may be of any conventional design, such as a centrifugal and/or electrical separation system. Separated iron oxides flow downwardly by gravity through standpipe 27 aerated through lines 29 by an aerating gas to facilitate the flow of the solids, and enter line 3 wherein they are resuspended in the reducing gas and recycled together with fresh magnetite to reduction chamber 10. Gases substantially free of solids are withdrawn overhead from separator 25 through line 31, passed through a water removal system which may comprise a condenser 33, a knock-out vessel 35 and, if desired, a drying zone (not shown), and either vented through line 37 or recycled through line 39 to the gas feed line 3.

The embodiment of my invention illustrated by the drawing permits of various modifications. The flow conditions in reduction chamber 10 may be such as to permit the formation of a dense turbulent fluidized solids phase with a well defined upper level, from which the solid reduction product may be withdrawn by gravity through an overflow standpipe in countercurrent flow to the reducing gas, and passed by means of a carrier gas to the magnetic separator or in any other manner known per se in the art of fluidized solids handling. Similarly, standpipes 7 and 27 may be replaced by mechanical conveyors or the like. If desired, one or more substantially vertical baffles of non-magnetic, e. g. refractory, material preferably staggered and/or adjustable in height may be arranged in separator 15 to catch reduced particles sufficiently deflected by the magnetic field, and guide the same into one or more withdrawal pipes 17. The walls of separator 15 and pipe 17, insofar as they are within the magnetic field are preferably made of or lined with non-magnetic material such as glass, enamel or organo-silicone polymers or a non-magnetic metal in order to facilitate the flow of the separated magnetic solids. For the same purpose mechanical stirrers, scrapers or shaking devices may be arranged within or attached to surfaces which are within the magnetic field and over which magnetic solids are passed. Instead of locating the magnet outside separator 15 substantially as shown, it may be arranged within separator 15. In this case the magnet may be given the form of a rotating drum cooperating with a scraper so as to pick up the deflected magnetic solids when passing through the upper portion of its circular path and to be freed of adhering magnetic solids by the scraper in the lower portion of its circular path, all in a manner known in the art. Furthermore it will be understood that the conditions and design of the system may be readily changed to permit horizontal flow in chamber 10, vertical flow in separator 15, upward or downward vertical flow or horizontal flow in either zone. Numerous other modifications of my invention will appear to those familiar with the art without departing from the spirit thereof.

The term "magnetic" as used in this specification refers to ferromagnetism rather than to diamagnetism.

The foregoing description and my exemplary diagram have merely served to illustrate specific applications and results of the invention but are not intended to be limiting and I do not mean to be restricted thereto but only to the scope of the appended claims.

I claim:

1. The process of producing reduced powdered catalysts of highest utility for the synthesis of hydrocarbons from carbon monoxide and hydrogen which comprises subjecting in a reduction zone finely divided solid oxygen compounds of ferro-magnetic iron group metals suspended in a reducing gas at a temperature of about 500°–1600° F. to reducing conditions for a time sufficient to cause substantial but incomplete reduction and insufficient to cause excessive sintering of substantially reduced solids of highest utility, passing a suspension of the total solid product of said reduction zone in a gas through a magnetic separation zone, precipitating in said magnetic separation zone by means of a magnetic field at least one fraction of solids reduced to a total oxygen content of not more than 5%, recovering said fraction, subjecting the residual suspension to a gas-solids separation in a gas-solids separation zone, subjecting solids separated in said gas-solids separation zone to a renewed reduction at said conditions followed by said magnetic precipitation, and repeating the cycle until said oxygen compounds are substantially completely converted at said conditions into solids of said total oxygen content.

2. The process of claim 1 wherein said renewed reduction is carried out in said reduction zone.

3. The process of claim 2 wherein about 50% to 75% of the oxygen compounds is reduced to an overall oxygen content of less than 2% per pass through said reduction zone.

4. In the method of producing powdered catalysts by reducing solid oxygen compounds of ferromagnetic iron group metals suspended in a reducing gas at a temperature of about 500°–1600° F., the improvement which comprises separating solids reduced to a total oxygen content of not more than 5% from reduced solids of a higher oxygen content by means of a magnetic field while the reduced solids are suspended in a gas, subjecting said solids of higher oxygen content to a renewed reduction to produce additional solids of said total oxygen content and repeating the cycle until said oxygen compounds are substantially completely converted into solids of said total oxygen content.

5. The process of producing reduced powdered catalyst of high utility for the synthesis of hydrocarbons from carbon monoxide and hydrogen which comprises subjecting in a reduction zone finely divided solid oxygen compounds of ferromagnetic iron group metals suspended in a reducing gas to reducing conditions including temperatures of about 400°–1600° F. and contact times of about 0.5–10 minutes and correlated to cause substantial but incomplete reduction corresponding to a reduction of about 50–75% of said oxygen compounds to an overall oxygen content of less than 2% per pass, while avoiding excessive sintering of substantially reduced solids of high utility, passing a suspension of the total solid product of said reduction zone in a gas through a magnetic separation zone, precipitating in said magnetic separation zone by means of a magnetic field at least one fraction of solids reduced to a total oxygen content of not more than 5%, recovering said fraction, subjecting the residual suspension to a gas-solids separation in a gas-solids separation zone, subjecting solids separated in said gas-solids separation zone to a renewed reduction at said conditions followed by said magnetic precipitation, and repeating the cycle until said oxygen compounds are substantially completely converted at said conditions into solids of said total oxygen content.

6. The process of claim 5 in which said oxygen compound is magnetite having a particle size of about 80–325 mesh, said reducing gas is hydrogen flowing upwardly through said reduction zone at a linear velocity of about 0.5–3 ft. per second, said temperature is about 900°–1200° F., and said contact time is about 2–5 minutes.

HANS G. VESTERDAL.

REFERENCES CITED

The following references are of record in the file of this patent:

UNITED STATES PATENTS

| Number | Name | Date |
|---|---|---|
| 1,318,431 | Adell | Oct. 14, 1909 |
| 1,588,420 | Hindshaw | June 15, 1926 |
| 2,112,643 | Baensch et al. | Mar. 29, 1938 |
| 2,287,663 | Brassert | June 23, 1942 |
| 2,399,984 | Caldwell | May 7, 1946 |

FOREIGN PATENTS

| Number | Country | Date |
|---|---|---|
| 131,235 | Austria | Jan. 10, 1933 |
| 534,622 | Germany | Sept. 30, 1931 |